(12) United States Patent
Hill et al.

(10) Patent No.: US 7,233,849 B2
(45) Date of Patent: Jun. 19, 2007

(54) AUTOMOBILE COMMUNICATION COURTESY DISPLAY

(76) Inventors: Danny Lee Hill, 6362 Blue Bonnet Common, Livermore, CA (US) 94551; Debra Hill, 6362 Blue Bonnet Common, Livermore, CA (US) 94551

( * ) Notice: Subject to any disclaimer, the term of this patent is extended or adjusted under 35 U.S.C. 154(b) by 89 days.

(21) Appl. No.: 10/863,110

(22) Filed: Jun. 8, 2004

(65) Prior Publication Data
US 2005/0273232 A1 Dec. 8, 2005

(51) Int. Cl.
*G06F 7/00* (2006.01)
(52) U.S. Cl. .............................. 701/36; 701/28; 701/32; 701/35
(58) Field of Classification Search ................ 701/28, 701/32, 33, 35, 36; 455/412.1, 412.2
See application file for complete search history.

(56) References Cited
U.S. PATENT DOCUMENTS

| 3,678,457 | A | 7/1972 | Lev |
| 4,191,939 | A | 3/1980 | Bauman |
| 4,361,828 | A | 11/1982 | Hose |
| 4,431,984 | A | 2/1984 | Bileck |
| 4,574,269 | A | 3/1986 | Miller |
| 4,631,516 | A | 12/1986 | Clinker |
| 4,860,476 | A | 8/1989 | Hall |
| 4,868,542 | A | 9/1989 | Thompson |
| 6,446,375 | B1 | 9/2002 | Davis |
| 6,941,194 | B1 * | 9/2005 | Dauner et al. .................. 701/1 |
| 2001/0034220 | A1 * | 10/2001 | Berstis .................... 455/186.1 |
| 2004/0230480 | A1 * | 11/2004 | Kanayama .................... 705/13 |

\* cited by examiner

*Primary Examiner*—Gertrude A. Jeanglaude
(74) *Attorney, Agent, or Firm*—Chase Law Firm, L.C.

(57) ABSTRACT

An automobile communication system is provided for communicating with others by displaying operator selected or input messages on a display mounted in the rear window of a vehicle. The operator may select messages on a keypad or by voice commands received by a microphone mounted in the vehicle. The system may include predetermined messages and may be programmed to include additional messages for display.

11 Claims, 2 Drawing Sheets

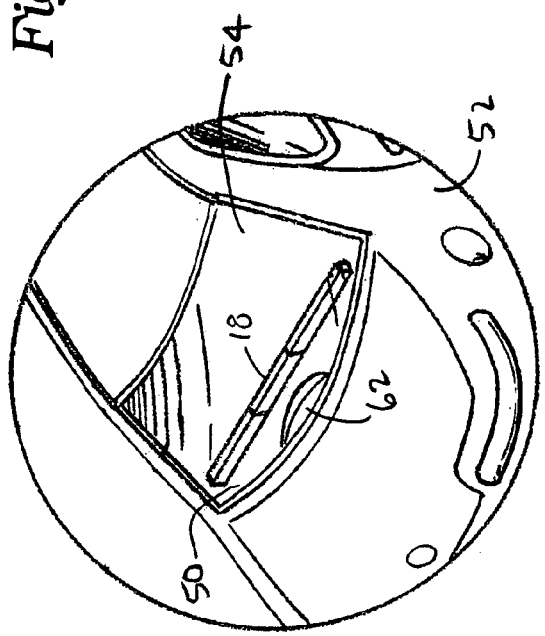
Fig. 4
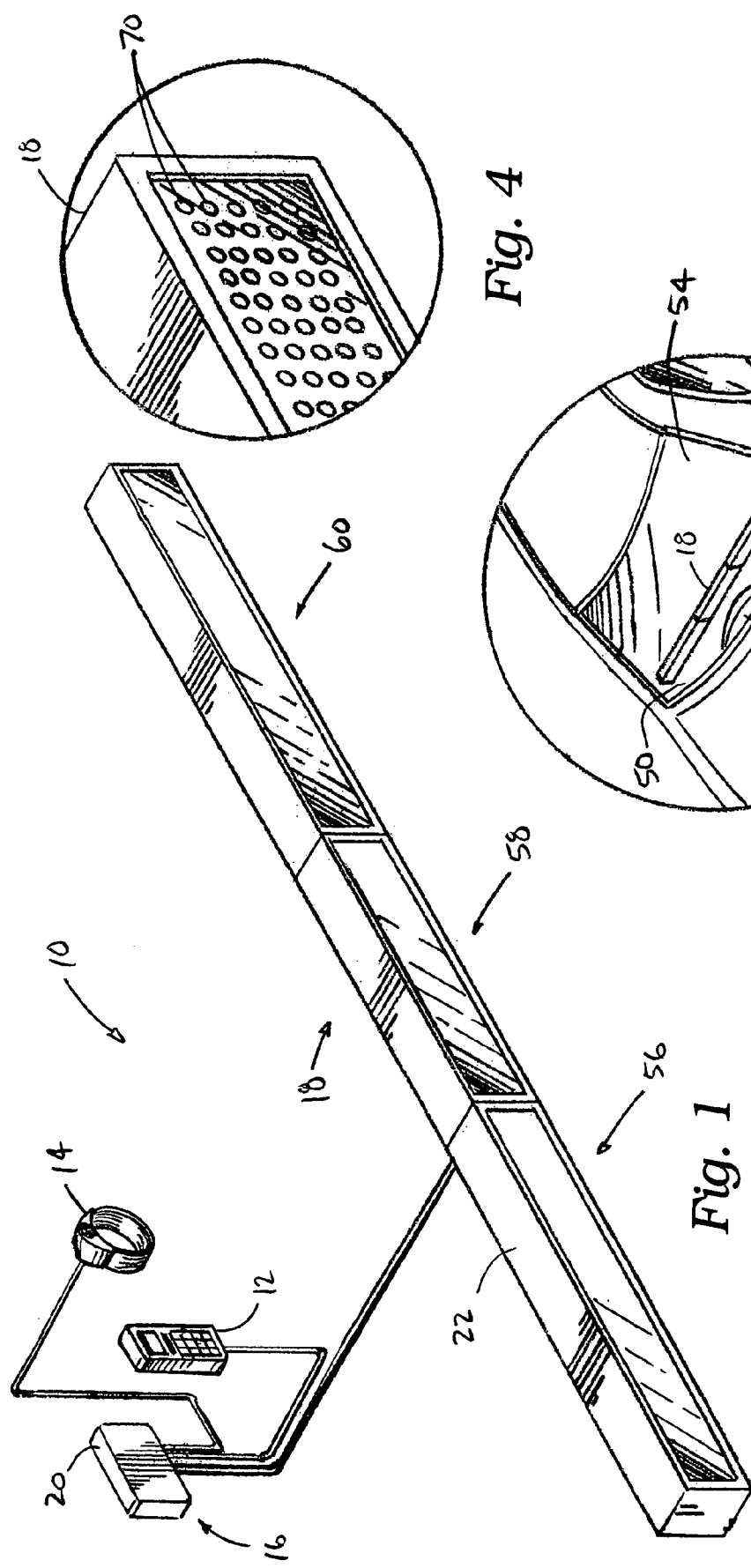
Fig. 5
Fig. 1

AUTOMOBILE COMMUNICATION COURTESY DISPLAY

FIELD OF THE INVENTION

The present invention relates to communication devices and, more particularly, to display for use in an automobile for communicating or signaling the driver of another vehicle.

BACKGROUND OF THE INVENTION

Various systems have been proposed to display a message in a vehicle to be read by the driver of another vehicle. Typically, these systems include a static back-lit display in the rear window which is illuminated when the brake peddle is depressed or at the option of the driver. Other units allow the driver to select from a limited number of messages to be displayed or input a message, via a keyboard, into the system. To display the message, the driver's attention may be directed away from the road, possibly creating a dangerous situation. Additionally, it would be helpful to provide a message to other vehicles as to changes of direction or forewarn of road conditions up ahead.

SUMMARY OF THE INVENTION

The present invention provides a sectioned scrolling message on a display which is mounted in the rear window of a vehicle. The system includes a microphone for receiving voice commands and messages from the driver, a processor for processing inputs from the microphone and from a keypad and for formatting messages for output and presentation on the display.

BRIEF DESCRIPTION OF THE DRAWINGS

FIG. 1 is a diagrammatic perspective view of the display system of the present invention.
FIG. 4 is a partial enlarged view of the display of FIG. 1.
FIG. 5 is a partial view of the display shown mounted in the rear window of a vehicle.

DETAILED DESCRIPTION

Figure 3:
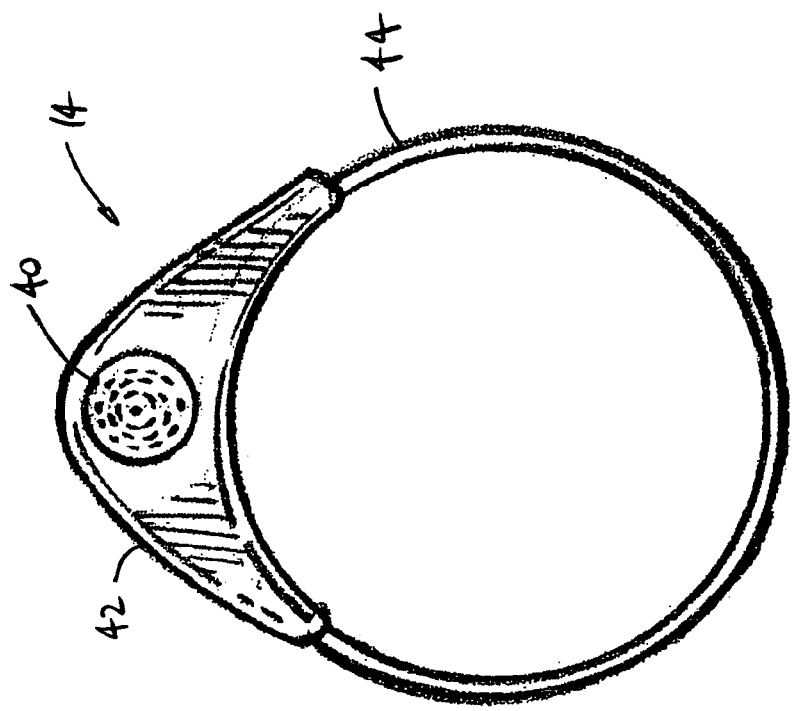
FIG. 3 is an enlarged view of the microphone harness of FIG. 1.

Referring to FIG. 1, the communication system of the present invention is generally indicated by reference numeral 10. Communication system 10 includes a controller 12, a microphone harness 14, a microprocessor 16 and a display 18. The microprocessor 16 may include a separate housing 20 or may be located in display housing 22.

Figure 2:
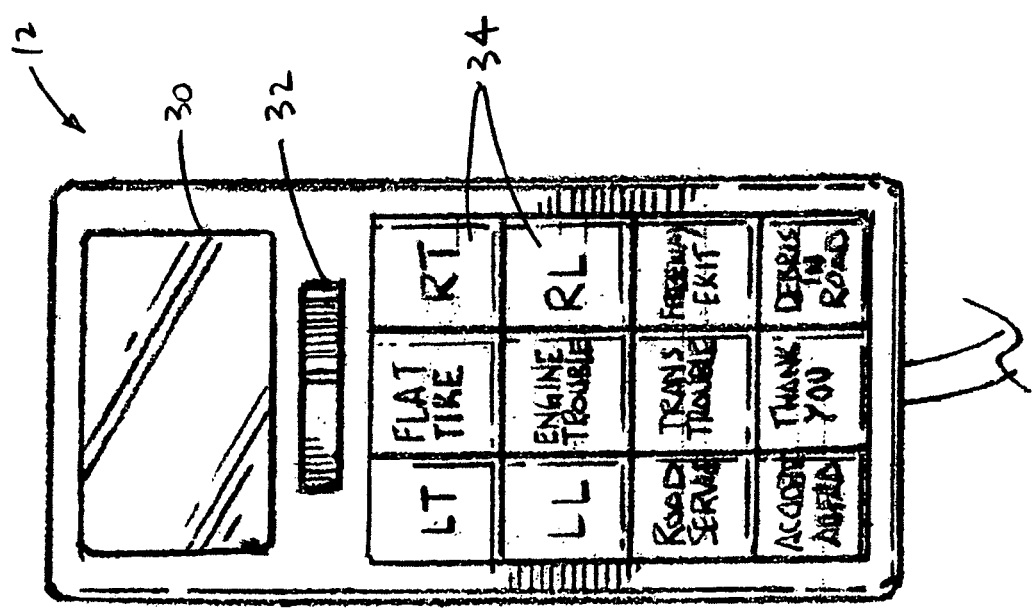
FIG. 2 is an enlarged view of the keypad of FIG. 1.

Referring to FIG. 2, controller 12 includes an illuminated display 30, a voice/manual switch 32 and an illuminated keypad 34. Illuminated display 30 may be a standard back-lit LCD display with two or three lines of text, for example. Illuminated display 30 displays the current message, if any, on display 18.

Voice/manual switch 32 allows the user to toggle between voice mode where input is received from the microphone 14 and manual mode where input is received from the keypad 34. Voice/manual switch 32 may also include a third position (not shown) associated with a programming mode or a separate switch (not shown) may also be used. In a programming mode the user may associate a word or short command with a longer message. For example, the user may associate saying "LL" with the message "Left Lane". Using a keyboard or other input device known in the art, the user may expand the array of messages pre-programmed into the unit. The user may then record a short-hand command associated with the message to display the message.

Messages such as "LEFT TURN," "RIGHT TURN," "FLAT TIRE," "LEFT LANE", "RIGHT LANE," "ENGINE TROUBLE," "ROAD SERVICE," "TRANSMISSION TROUBLE," "FREEWAY EXIT," "ACCIDENT AHEAD," "THANK YOU," and "DEBRIS IN ROAD" may be pre-programmed into the controller 16, for example.

Referring to FIG. 3, microphone harness 14 includes a microphone 40 mounted in a housing 42 and an adjustable steering column belt 44. The microphone harness 14 fits over the steering column (not shown) of a vehicle and is held in place by the adjustable steering column belt 44, with the microphone 40 directed toward the driver (not shown). In this position, the driver may simply speak commands which are received by the microphone 40, without directing his or her attention away from the road. This is particularly important when there is an accident, or road construction or debris in the road, and all of the driver's attention should be focused on operating the vehicle and not directed toward the message unit 10 or keypad 12.

Microphone 40 is connected to the controller 16. Input from the microphone 40 in the form of voice commands is interpreted by the controller 16 to display the associated message on display 18.

Referring to FIGS. 1, 4 and 5, display 18 in housing 22 is mounted on the rear deck 50 of a vehicle 52 and visible through the rear window 54. Display 18 may be divided into three sections 56, 58 and 60. In some vehicles a center brake light 62 may obscure the center section 58 of display 18. In this installation the center section 58 of display 18 is inactive and messages scrolling across the display 18 would simply scroll from section 56 to section 60, skipping section 58. In another embodiment, the rear brake light 62 may be removed and display section 58 may serve a dual purpose of a rear brake light when the brake pedal is depressed, and a display for messages when the brake pedal is not depressed.

Display 18 includes an array of LEDs 70 as shown in FIG. 4. The controller 16 may include a display driver or a display driver may be included in the display housing 22 and interfaced with the controller 16 to provide a scrolling message on display 18.

In operation, the driver may be driving along a street or a highway. If the driver is going to change from the right lane to the left lane the driver says "left lane". The microphone 40 transmits the signal to the controller 16 which outputs a control signal to the display driver. The display driver formats the message and the message "LEFT LANE" is displayed on display 18. The message may scroll across the display 18. Another message such as "PLEASE" or "THANK YOU" may follow any of the messages. The messages may repeat a predetermined number of times or may repeat for a predetermined period of time.

Having thus described the invention, what is claimed as new and desired to be secured by Letters Patent is:

1. An automobile communication system comprising:
   an input controller having a display, a selector switch and a keypad, said selector switch having a first manual position and a second voice position;
   a microphone;
   a display mounted in the rear window of a vehicle and viewable outside the vehicle having an array of LEDs for displaying a message, and a processing unit having a processor for controlling the system, a memory for storing commands and messages, and a display driver, said processing unit responsive to input received from said microphone and said input controller to select a message corresponding to an operator selection and transfer said message to said display for output on said display.

2. The system as set forth in claim 1 wherein said keypad includes a plurality of keys, each of said keys corresponding to a message, said processing unit selecting the corresponding message in response to depression of one of said keys.

3. The system as set forth in claim 1 wherein said message is scrolled across said display.

4. The system as set forth in claim 1 wherein said message is scrolled across said display a predetermined number of times.

5. The system as set forth in claim 1 wherein said message is scrolled across said display for a predetermined period of time.

6. The system as set forth in claim 1 further comprising a program switch coupled to said processing unit for storing new messages.

7. The system as set forth in claim 1 wherein after a message has been displayed another message is automatically displayed.

8. The system as set forth in claim 7 wherein said another message is "please."

9. The system as set forth in claim 7 wherein said another message is "thank you."

10. The system as set forth in claim 1 wherein said display includes a center portion and said processing unit is responsive to a brake signal from said vehicle to illuminate said center portion of said display.

11. The system as set forth in claim 1 wherein said display includes an array of light emitting diodes.

* * * * *